(12) United States Patent
Aoyama

(10) Patent No.: US 7,539,081 B2
(45) Date of Patent: May 26, 2009

(54) SEABED RESOURCE EXPLORATION SYSTEM AND SEABED RESOURCE EXPLORATION METHOD

(76) Inventor: Chiharu Aoyama, c/o Japan's Independent Institute Co., Ltd., Ishii Building 7th Floor, 1-10, Shinbashi 3-chome, Minato-ku, Tokyo 105-0004 (JP)

( * ) Notice: Subject to any disclaimer, the term of this patent is extended or adjusted under 35 U.S.C. 154(b) by 160 days.

(21) Appl. No.: 11/665,826

(22) PCT Filed: Oct. 21, 2005

(86) PCT No.: PCT/JP2005/019410

§ 371 (c)(1),
(2), (4) Date: Jul. 17, 2007

(87) PCT Pub. No.: WO2006/043668

PCT Pub. Date: Apr. 27, 2006

(65) Prior Publication Data

US 2008/0112266 A1    May 15, 2008

(30) Foreign Application Priority Data

Oct. 22, 2004    (JP)    ............... 2004-308815

(51) Int. Cl.
*G01S 15/00*    (2006.01)

(52) U.S. Cl. ............... 367/87; 367/15; 367/18; 367/88; 73/19.03

(58) Field of Classification Search ............ 367/87
See application file for complete search history.

(56) References Cited

U.S. PATENT DOCUMENTS 4,415,997 A    11/1983    Wilson (Continued)

FOREIGN PATENT DOCUMENTS

GB    1 411 645    10/1975

(Continued)

OTHER PUBLICATIONS

Richardson et al, Coastal Benthic Boundary Layer: A Final Review of the Program, Sep. 1998, NRL Memorandum Report.*

(Continued)

*Primary Examiner*—Thomas H Tarcza
*Assistant Examiner*—Luke D Ratcliffe
(74) *Attorney, Agent, or Firm*—The Nath Law Group; Jerald L. Meyer; Derek Richmond

(57) ABSTRACT

A seabed resource exploration system includes: a vibrator 1 for transmitting a sound wave into the sea and receiving a scattered wave in which the sound wave is reflected on a boundary surface between seawater and a mixture of methane gas and methane hydrate, which exists in the seawater; and an analyzer 17 for determining that the methane hydrate exists in a seabed immediately under the mixture when backscattering strength, calculated by the transmitted sound wave and the received scattered wave, is in a predetermined relationship. The predetermined relationship satisfies a relationship that a maximum value of the backscattering strength is −60 to −30 dB and an average value of the backscattering strength is −70 to −50 dB. The backscattering strength is on a grid obtained by cutting the mixture into round slices in the depth direction by a predetermined width, in a range from the seabed to a predetermined height.

3 Claims, 7 Drawing Sheets

U.S. PATENT DOCUMENTS

| 5,430,689 | A | 7/1995 | Rigsby et al. |
| 6,578,405 | B2 * | 6/2003 | Kleinberg et al. .......... 73/19.01 |
| 6,898,151 | B1 * | 5/2005 | Lyon ........................... 367/99 |

FOREIGN PATENT DOCUMENTS

| JP | 2001-166055 | 6/2001 |
| JP | 2003-084069 | 3/2003 |
| RU | 2 145 102 | 1/2000 |
| RU | 2 156 479 | 9/2000 |
| SU | 900236 | 1/1982 |
| SU | 972452 | 11/1982 |
| SU | 668451 | 2/1985 |
| SU | 1670647 | 8/1991 |

OTHER PUBLICATIONS

Arata Kaneko, "Kaiyo Onkyo Gazo System no Suchi Simulation", *Reports of Research Institute of Applied Mechanics, Kyushu University*, No. 63, pp. 347-359, (1987).

http://www.mh21japan/gr.jp/english/index.html, "Research Consortium for Methane Hydrate Resources in Japan".

Aoyama, C. et al., "Calibration of Quantitative Echo Sounders by Using Echo from Water Tank Surface", *Nippon Suison Gakkaishi (The Japanese Society of Fisheries Science)*, vol. 63, No. 4, pp. 570-577, (1997).

* cited by examiner

SEABED RESOURCE EXPLORATION SYSTEM AND SEABED RESOURCE EXPLORATION METHOD

TECHNICAL FIELD

The present invention relates to a seabed resource exploration system and a seabed resource exploration method.

BACKGROUND ART

Heretofore, exploration of seabed resources such as gas hydrate has been performed by searching only geologic data under the seabed by using an audio instrument as a low-frequency sound source for seabed geology exploration.

As such a seabed resource exploration method, for example, a seismic exploration method has been used (for example, refer to http://www.mh21japan.gr.jp/ (homepage of The Research Consortium for Methane Hydrate Resources in Japan)). This is a method which is used for investigating a distribution of strata containing petroleum/natural gas in petroleum/natural gas exploration, artificially generates vibrations like that of an earthquake, explores the geology by using the vibrations, and explores the resources based on the results of the exploration.

Moreover, when certain vibrations are given in the vicinity of the surface of the sea, sound waves are generated and transmitted into the sea. A seismic reflection method for performing the exploration by using the sound waves reflected on the surface of the seabed is also used.

Furthermore, cables called streamers are used in order to receive the reflecting sound waves, and recently, a research using plural streamer cables has become not uncommon. In a recent petroleum-exploring geocentric exploration, there is also a case where ten or more streamer cables with a length of 6000 m or more are towed by ships at one time to make the research. When the plural streamer cables are used as described, solid seismic exploration records are obtained, and accordingly, such a method is called a 3D (three-dimensional) seismic exploration method.

However, the seismic exploration method does not directly confirm the resources such as the petroleum/natural gas, and the seabed is mined while assuming the presence of the resources from the results of the geology exploration. Accordingly, there are many cases where the resources do not come out even if the seabed is actually mined.

Moreover, the above-described seismic reflection method and 3D seismic exploration method have large scales, and require much expense and time.

Consequently, considering the above-described problems, it is an object of the present invention to provide a seabed resource exploration system and a seabed resource exploration method, which are highly reliable and capable of exploring the seabed resources inexpensively.

DISCLOSURE OF THE INVENTION

In order to achieve the foregoing object, a first feature of the present invention is summarized as a seabed resource exploration system including: (a) transmitting means for transmitting a sound wave into the sea; (b) receiving means for receiving a scattered wave in which the sound wave is reflected on a boundary surface between seawater and a mixture of methane gas and methane hydrate, which exists in the seawater; and (c) analyzing means for determining that the methane hydrate exists in a seabed immediately under the mixture when backscattering strength, calculated by the transmitted sound wave and the received scattered wave, is in a predetermined relationship, (d) wherein the predetermined relationship is that a maximum value of the backscattering strength is −60 to −30 dB and an average value of the backscattering strength is −70 to −50 dB, the backscattering strength is on a grid obtained by cutting the mixture into round slices in the depth direction by a predetermined width, in a range from the seabed to a predetermined height.

Moreover, in the seabed resource exploration system according to the first feature, it is preferable that the predetermined height be 300 m, and that the predetermined width be 20 to 100 m.

A second feature of the present invention is summarized as a seabed resource exploration method, including the steps of: (a) transmitting a sound wave into the sea; (b) receiving a scattered wave in which the sound wave is reflected on a boundary surface between seawater and a mixture of methane gas and methane hydrate, which exists in the seawater; and (c) determining that the methane hydrate exists in a seabed immediately under the mixture when backscattering strength, calculated by the transmitted sound wave and the received scattered wave, is in a predetermined relationship, (d) wherein the predetermined relationship is that a maximum value of the backscattering strength is −60 to −30 dB and an average value of the backscattering strength is −70 to −50 dB, the backscattering strength is on a grid obtained by cutting the mixture into round slices in the depth direction by a predetermined width, in a range from the seabed to a predetermined height.

BEST MODE FOR CARRYING OUT THE INVENTION

Figure 1:
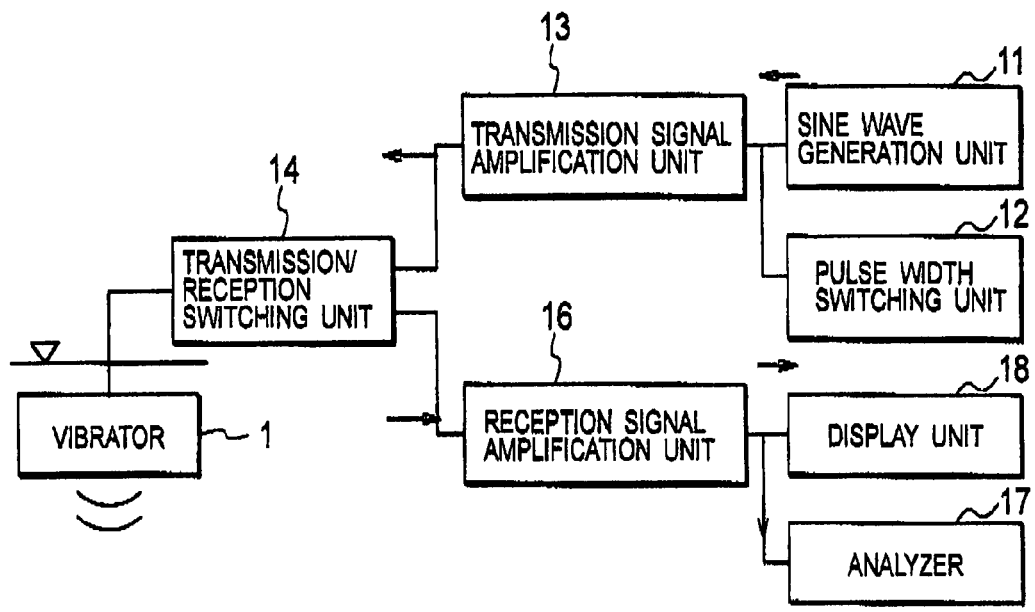
FIG. 1 is a constructional block diagram of a seabed resource exploration system according to an embodiment of the present invention.

Next, a description of an embodiment of the present invention will be made with reference to the drawings. In the following description of the drawings, the same or similar reference numerals are assigned to the same or similar portions. However, it should be noted that the drawings are schematic.

(Seabed Resource Exploration System)

In this embodiment, methane hydrate as a seabed resource is explored. The inventors of the present invention discover that an object, in which methane gas and the methane hydrate are mixed together, gushes up from a seabed where the methane hydrate exists, and assume a place where the methane hydrate exists by exploring the object.

As shown in FIG. 1, a seabed exploration system according to this embodiment includes a sine wave generation unit 11, a pulse width switching unit 12, a transmission signal amplification unit 13, a transmission/reception switching unit 14, a vibrator 1 (receiver and transmitter), a reception signal amplification unit 16, an analyzer 17, and a display unit 18. As the seabed resource exploration system described above, a fishfinder can be used.

Figure 2:
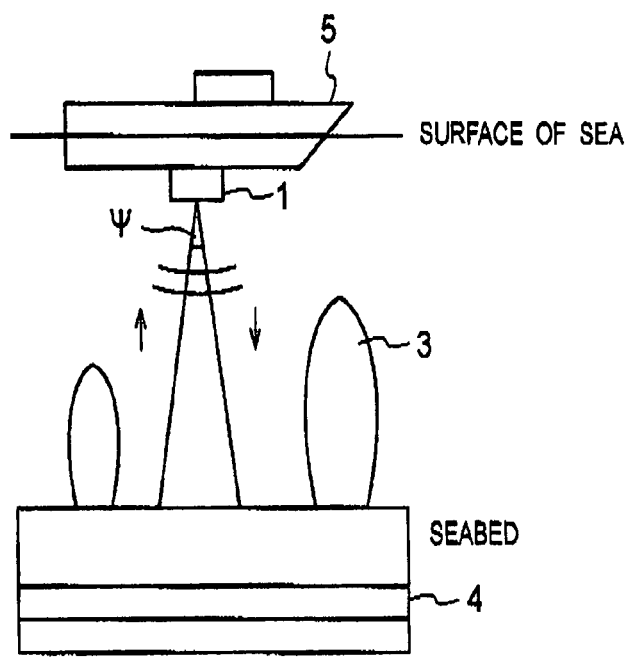
FIG. 2 is a view for explaining exploration of seabed resources according to the embodiment of the present invention.

Moreover, as shown in FIG. 2, the vibrator 1 is attached to a bottom of a ship 5. The ship 5 advances forward at a speed of 0 to 3 knots. Methane hydrate 4 exists in the seabed, and a mixture 3 of the methane gas and the methane hydrate is generated therefrom.

The sine wave generation unit 11 generates a sine wave. It is necessary that a frequency at this time be a frequency as low as possible. For example, the frequency is 1 to 50 kHz, and preferably, is set at 40 kHz or less.

The pulse width switching unit 12 designates a pulse width of the sine wave when the sine wave is transmitted.

Moreover, since a depth of the sea where the mixture 3 exists is deep, a repeating frequency is designated, for example, at four seconds per 1000 m of the depth of the sea.

The transmission signal amplification unit 13 amplifies a signal inputted from the sine wave generation unit 11.

The transmission/reception switching unit 14 performs switching between transmission and reception.

As shown in FIG. 2, the vibrator 1 converts a voltage inputted from the transmission/reception switching unit 14 into a sound pressure, and transmits, into the sea, the sound pressure as a sound wave with a predetermined equivalent beam width $\Psi$ (refer to "*Calibration of Measuring Fishfinder (Quantitative Echo Sounder) Using Water Surface Reflection in Water Bath*", The Japanese Society of Fisheries Science, 63(4), 570-577 (1977)). This equivalent beam width $\Psi$ is substantially proportional to (diameter of vibration plane of vibrator 1)/(wavelength of sine wave). Moreover, since the seabed resources are produced much in deepwater area, the beam width is sharpened in order to raise horizontal resolution. For example, the beam width is set at approximately −19.1 dB.

Moreover, the vibrator 1 receives a scattered wave which is the sound wave reflected on a boundary surface between seawater and an object present in the seawater and different therefrom in density. The vibrator 1 receives a scattered wave reflected on a boundary surface between the seawater and the mixture 3 of the methane gas and the methane hydrate. Then, the vibrator 1 converts a sound pressure of the scattered wave into a voltage signal.

The transmission/reception switching unit 14 performs the switching between the transmission and the reception.

The reception signal amplification unit 16 amplifies the voltage signal outputted from the transmission/reception switching unit 14.

The analyzer 17 determines that the methane hydrate 4 exists in the seabed immediately under the mixture 3 when backscattering strength SV, calculated by the transmitted sound wave and the received scattered wave, is in a predetermined relationship. The term "backscattering strength" here refers to intensity of the scattered wave per unit volume of the object which is different in density from the seawater. The backscattering strength Sv (dB) is given by Equation (1) and Equation (2) (for example, refer to *Ocean Acoustics, Fundamental and Application*, The Marine Acoustics Society of Japan, 1984, pp. 80 to 85).

$$sv = Is/Ii \quad \text{Equation (1)}$$

$$SV = 10 \log sv \quad \text{Equation (2)}$$

Wherein Ii denotes intensity of the plane sound wave incident onto the vibrator 1, and Is denotes intensity of the scattered wave a unit distance away from an acoustic center of the object having a unit volume.

As shown in FIG. 2, the mixture 3 has a columnar shape. The analyzer 17 calculates maximum values, average values and minimum values of the backscattering strengths SV on grids obtained by cutting the mixture 3 into round slices in the depth direction by a predetermined width, in a range from the seabed to a predetermined height.

Specifically, when the maximum value of the backscattering strength SV on one of the above-described grids is −60 to −30 dB, and the average value thereof is −70 to −50 dB, the analyzer 17 determines that the methane hydrate 4 exists in the seabed immediately thereunder. In addition to this condition, when the minimum value of the backscattering strength SV is −90 dB or more, the analyzer 17 may determine that the methane hydrate 4 exists in the seabed immediately thereunder.

Moreover, when the mixture 3 has backscattering strength as large as −45 to −30 dB in a height range of 100 m or less from immediately above the seabed, the analyzer 17 determines that there is a particularly high possibility that the methane hydrate 4 exists. This is because an ultrasonic wave is scattered on dense methane gas or methane hydrate crystals.

Figure 3:
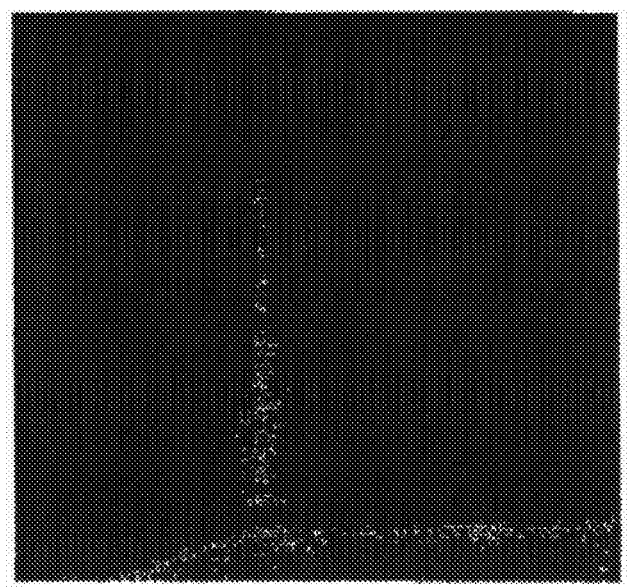
FIG. 3 is an example of a screen displayed by a display unit of the seabed resource exploration system according to the embodiment of the present invention (No. 1).

As shown in FIG. 3, the display unit 18 visualizes and displays an outline of the mixture 3 having the predetermined backscattering strength. For example, the display unit 18 refers to a screen of a monitor or the like, and a liquid crystal display (LCD), a light-emitting diode (LED) panel, an electroluminescence (EL) panel, and the like are usable. Moreover, the display unit 18 may be a printer and the like.

Figure 4:
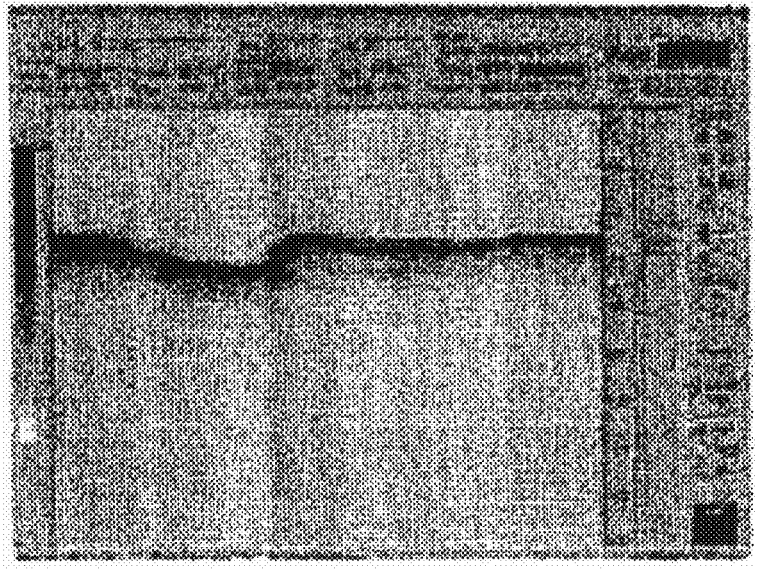
FIG. 4 is an example of the screen displayed by the display unit of the seabed resource exploration system according to the embodiment of the present invention (No. 2).

As shown in FIG. 4, the display unit 18 is also capable of displaying an outline of a surface of the seabed.

Note that, though not shown, the seabed resource exploration system, according to this embodiment, may include a program storage unit which stores a program for allowing the system to perform analysis processing. For the program storage unit, an internal memory unit such as a RAM may be used, or an external memory unit such as an HD and an FD may be used.

(Seabed Resource Exploration Method)

Figure 5:
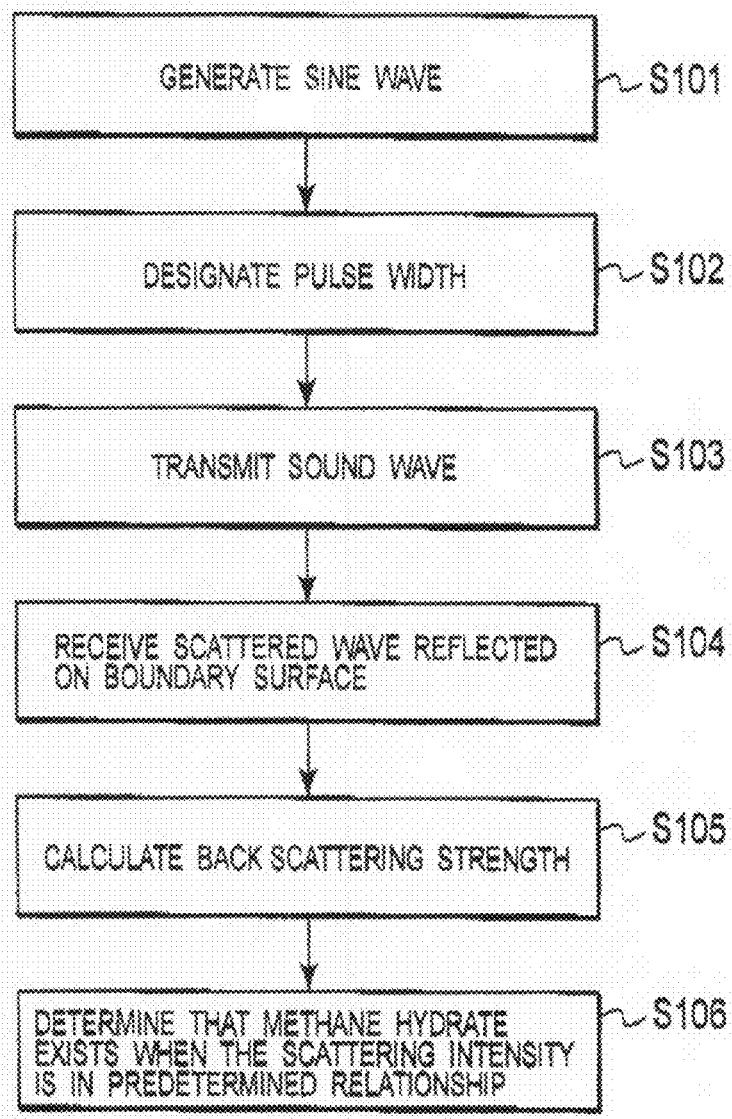
FIG. 5 is a flowchart showing a seabed resource exploration method according to the embodiment of the present invention.

Next, a description will be made of a seabed resource exploration method according to this embodiment by using FIG. 5.

First, in Step S101, the sine wave generation unit 11 generates a sine wave.

Next, in Step S102, the pulse width switching unit 12 designates the pulse width when the sine wave is transmitted. Next, the transmission signal amplification unit 13 amplifies the signal inputted from the sine wave generation unit 11, and the transmission/reception switching unit 14 switches the operation mode to the transmission.

Next, in Step S103, the vibrator 1 converts the amplified voltage signal to the sound pressure, and transmits the sound pressure as the sound wave with the predetermined equivalent beam width $\Psi$ into the sea. Subsequently, in Step S104, the vibrator 1 receives the scattered wave in which the sound wave is reflected on the boundary surface between the seawater and the mixture 3 of the methane gas and the methane hydrate, which exists in the seawater. The vibrator 1 converts the sound pressure of the scattered wave into the voltage signal.

Next, the transmission/reception switching unit 14 switches the operation mode to the reception. Next, the reception signal amplification unit 16 amplifies the voltage signal outputted from the transmission/reception switching unit 14.

Next, in Step S105, the analyzer 17 calculates the backscattering strength SV from the transmitted sound wave and the received scattered wave. Subsequently, in Step S106, when the calculated scattered intensity SV is in the predetermined relationship, the analyzer 17 determines that the methane hydrate 4 exists in the seabed immediately under the mixture 3. The predetermined relationship concerned is a relationship which satisfies that the maximum value of the backscattering strength, on the grid obtained by cutting the mixture 3 into round slices in the depth direction by the predetermined width, in the range from the seabed to the predetermined height, is −60 to −30 dB, and that the average value of the backscattering strength thereon is −70 to −50 dB.

Next, the display unit 18 visualizes and displays the backscattering strength.

(Function and Effect)

In accordance with the seabed resource exploration system and the seabed resource exploration method according to this embodiment, there are provided the vibrator 1 for transmitting a sound wave into the sea and receiving a scattered wave in which the sound wave is reflected on the boundary surface between the seawater and the mixture of the methane gas and the methane hydrate, which exists in the seawater, and the analyzer 17 for determining that the methane hydrate exists in the seabed immediately under the mixture 3 when the backscattering strength calculated by the transmitted sound wave and the received scattered wave has the predetermined relationship. In such a way, the seabed resource can be explored with high reliability and low cost.

Moreover, the analyzer 17 can determine that the resource exists in the seabed immediately under the object when the maximum value of the backscattering strength, on the grid obtained by cutting the mixture 3 into round slices in the depth direction by a predetermined width in a range from the seabed to the predetermined height, is −60 to −30 dB, and the average value of the backscattering strength thereon is −70 to −50 dB. This is thought to be because, when gas gushes up from the methane hydrate, the gas has the backscattering strength as described above owing to a composition thereof.

Furthermore, as predetermined conditions to be used by the analyzer 17 for making the determination, it is preferable that the above-described predetermined height be 300 m, and that the above-described predetermined width be 20 to 100 m.

Moreover, the display unit 18 which visualizes and displays the backscattering strength is further provided. In this way, the place where the seabed resource exists and the object originated from the seabed resource can be visually grasped, and the seabed resource can be explored efficiently without requiring much expense and time.

Furthermore, when the object has the backscattering strength of −45 to −30 dB in the height range of 100 m or less immediately above the seabed, the analyzer 17 can determine that the resource exists in the seabed immediately under the object. This, is thought to be because the ultrasonic wave is scattered by the dense gas or the crystals of the gas hydrate.

EXAMPLE

A more detailed description of the present invention will be made below by examples; however, the present invention is by no means limited to these examples.

In the Japan Sea, the inventors of the present invention explored the methane hydrate by using the seabed resource exploration system according to the present invention. The exploration was performed by a ship with a displacement of 1886 tons, and was performed by an existing fishfinder.

Figure 6:
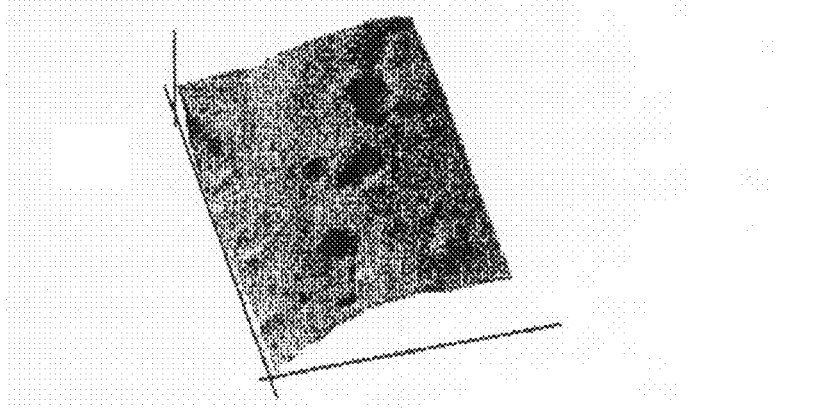
FIG. 6 is a three-dimensional map of an observed area according to an example of the present invention.
Figure 7:
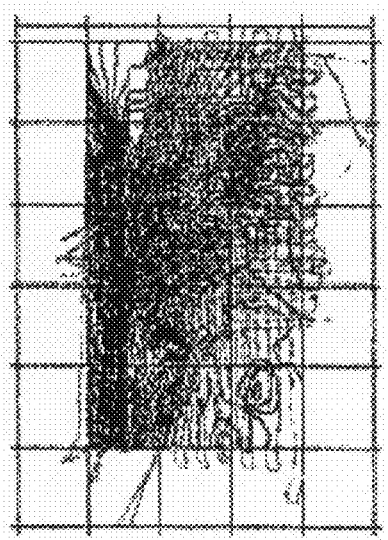
FIG. 7 is a navigation route for an observation according to the example of the present invention.

FIG. 6 is a three-dimensional map of the observed area. The interval of the ship was 0.05 nmi. and the speed thereof was 3 kt. The navigation route for the observation is shown in FIG. 7.

The system shown in FIG. 1 was used as the seabed resource exploration system. Specifically, KFC3000 as a measuring fishfinder (manufactured by Kaijo Sonic Corporation) was used. The frequency was 38 kHz, and the equivalent beam width $\Psi$ was −19.1 dB.

Figure 8:
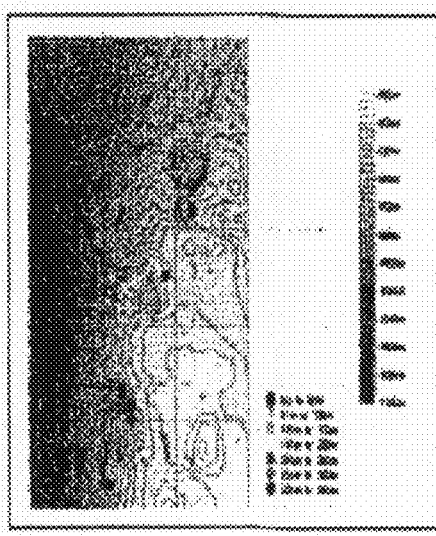
FIG. 8 is a map of a methane plume according to the example of the present invention.

FIG. 8 is a map of the methane gas spread in a columnar shape (hereinafter, referred to as "methane plumes"), which is mapped by the measuring fishfinder together with GPS position data.

In the echograms, the inventors of the present invention performed a measurement of 36 plumes, each of which has a diameter of approximately 100 m, a height of 200 to 700 m and a depth of 600 to 300 m from the surface of the sea. Subsequently, the inventors performed the measurement of the methane plumes every four seconds by using the measuring fishfinder, together with the GPS position data, while running the ship at a predetermined speed (FIGS. 9 to 12).

FIGS. 9 to 12 are the echograms of the methane plumes. Each axis of ordinates represents a distance of each methane plume from the surface of the vibrator 1, in other words, a distance thereof from a ship bottom. Each axis of abscissas represents a navigation distance of the ship.

Figure 9:
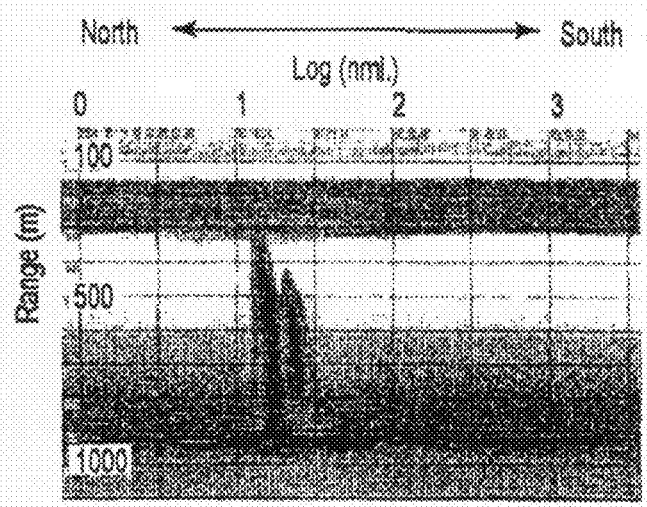
FIG. 9 is an echogram of the methane plume according to the example of the present invention (No. 1).
Figure 10:
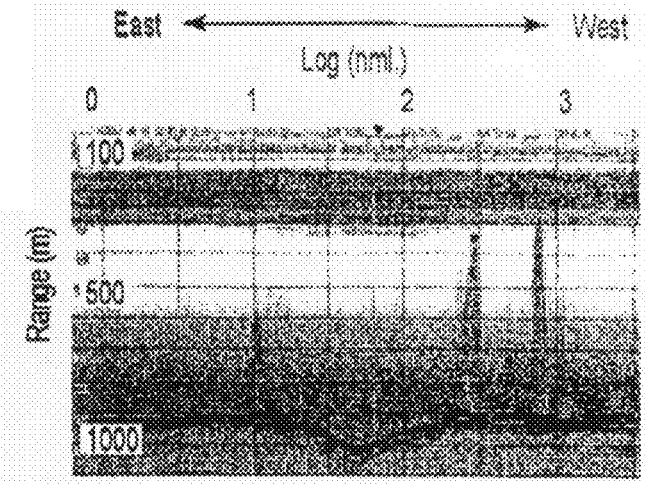
FIG. 10 is an echogram of the methane plume according to the example of the present invention (No. 2).
Figure 11:
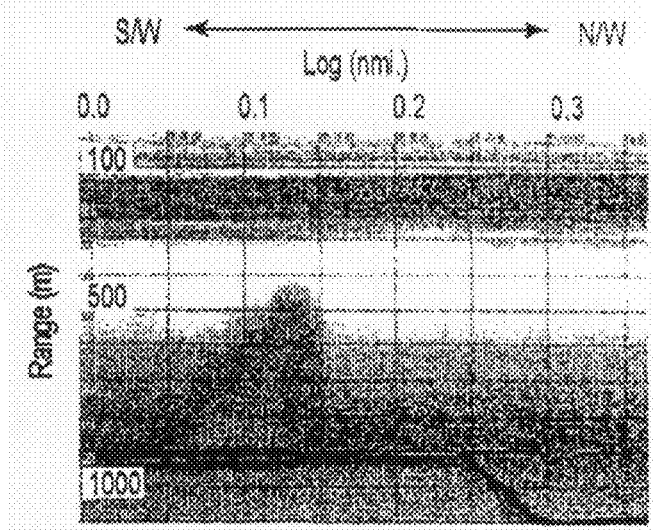
FIG. 11 is an echogram of the methane plume according to the example of the present invention (No. 3).
Figure 14:
FIG. 14 is a fist-sized chunk of methane hydrate, which is discovered in the example of the present invention.

FIGS. 9 to 12, each of a bold line on a lower portion of the screen represents the surface of the seabed. FIG. 11 shows a methane plume corresponding to a place where a fist-sized chunk of methane hydrate, which is shown in FIG. 14, was discovered.

FIG. 9 shows a plume inclined by a tide in the north direction at a depth of approximately 600 m. The speed of the ship at this time was three knots.

FIG. 10 shows a plume (second one from the left) located at the depth of 300 to 350 m. A tip end of the plume swells, and this is because the sea temperature rapidly rises around this depth.

FIG. 11 shows the plume at the place where the block of methane hydrate was discovered. The speed of the ship at this time was 0.3 knots.

Figure 12:
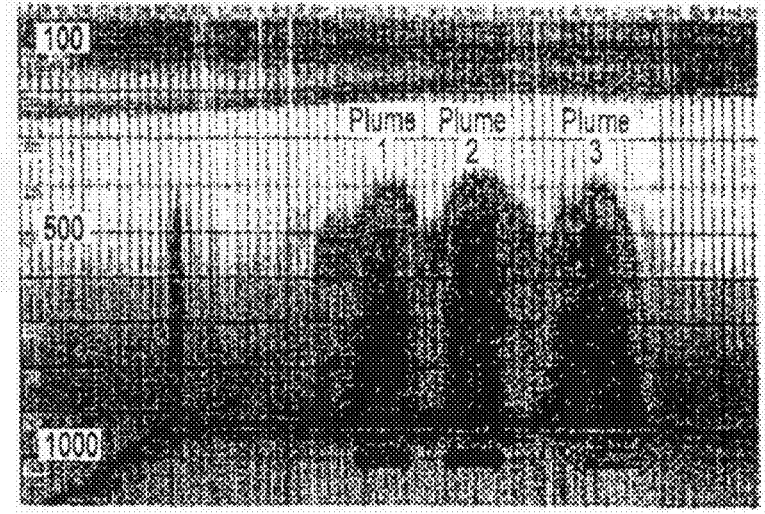
FIG. 12 is an echogram of the methane plume according to the example of the present invention (No. 4).

FIG. 12 shows plumes for which a CTD measurement was performed. At this time, the ship stopped its engine.

Figure 13:
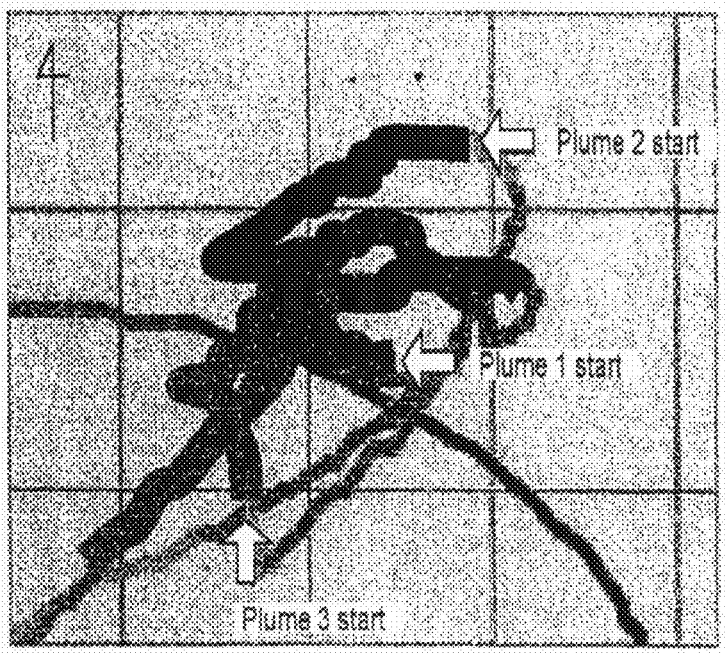
FIG. 13 is wakes while Plumes 1, 2 and 3 of FIG. 11 are being observed.

FIG. 13 is wakes while Plumes 1, 2 and 3 of FIG. 12 are being observed. A center bold line (portion indicated as "Plume 1 start") is a wake where the ultrasonic data of Plume 1 was measured. An upper bold line (portion indicated as "Plume 2 start") is a wake where the ultrasonic data of Plume 2 was measured. A lower bold line (portion indicated as "Plume 3 start") is a wake where the ultrasonic data of Plume 3 was measured. Grid lines of FIG. 13 have a size of 30 m×30 m.

When the echograms of the three plumes are compared with one another in FIG. 12, it turns out that these express different places of one plume.

A water temperature at the seabed was extremely low. It was 0.25° C. measured by the CTD.

The inventors of the present invention calculated the backscattering strengths SV from the respective methane plumes. The backscattering strength SV of each plume was calculated by using an integrating function as a part of the measuring fishfinder, under conditions where an integrated layer width was 100 m and an integration interval was one minute. Specifically, every 100 m of the depth, the columnar plume was cut into round slices by a fixed width (such portions cut into round slices are referred to as "grids"), and the backscattering strength SV was calculated for each grid. The Values of the backscattering strengths SV of the plumes are shown in Table 1.

the density of the methane gas is relatively constant in the range from the seabed to the depth of 700 m under the surface of the sea and that the gas gradually decreases therefrom toward the surface of the sea.

Figure 15:
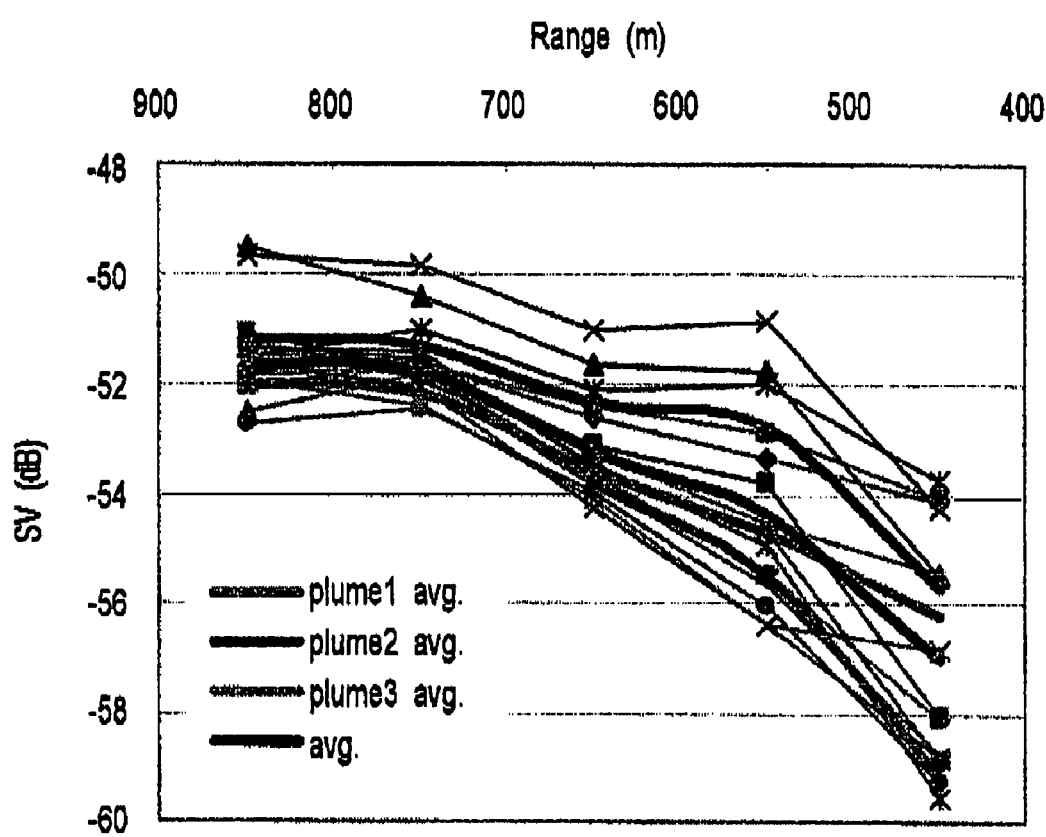
FIG. 15 is average backscattering strength SV of the three plumes according to the example of the present invention.

In FIG. 15, the average backscattering strength SV of Plume 2 is higher when compared with those of Plume 1 and Plume 3. As described above, these three plumes represent one plume. It is thought that the wake where the Plume 2 had been measured crossed the center of the plume and the wakes where the Plume 1 and Plume 3 had been measured crossed the ends of the plume.

(Results)

The inventors of the present invention mapped the methane plume, and in the echograms, performed measurements of 36 plumes each of which has the diameter of approximately 100 m and the height of 200 to 700 m, and reaches 600 to 300 m under the sea level.

Moreover, the inventors of the present invention calculated the backscattering strengths SV of the respective plumes. The backscattering strengths SV concerned were as shown in Table 1. Specifically, by analyzing the data in the sea, it was found out that, when the maximum value of the backscattering strength on the grid obtained by cutting the mixture into round slices in the depth direction by the predetermined width, in the range from the seabed to the predetermined height, is −54 to −35 dB and the average value of the backscattering strength thereon is −65 to −63 dB, the resource exists in the seabed immediately under the plume.

Moreover, the above-described predetermined height was 300 m, and the above-described predetermined width was 20 to 100 m. Specifically, the maximum value and average value

TABLE 1

| Thickness of Integrated Layer (m) | Average Depth of Integrated Layer (m) | Volume (m3) | Depth to Seabed (m) | Total Number of Calculations (times) | Total Number of Transmissions (times) | Average SV Value (dB) | Minimum SV Value (dB) | Maximum SV Value (dB) |
| --- | --- | --- | --- | --- | --- | --- | --- | --- |
| 84.6 | 847.09 | 109129106.3 | 896.1 | 164688 | 146 | −64.28 | −99.47 | −36.74 |
| 100.8 | 750.79 | 40604528.05 | 897.37 | 77952 | 58 | −64.48 | −95.76 | −53.12 |
| 30.3 | 618.49 | 10514647.58 | 898.77 | 29784 | 73 | −63.72 | −94.7 | −52.95 |
| 19.8 | 568.09 | 5424862.19 | 899.15 | 18216 | 69 | −63.83 | −99.9 | −52.39 |

In FIG. 15, an axis of ordinates represents the backscattering strength SV (dB), and an axis of abscissas represents the distance (m) from the ship bottom. The first bold line from the bottom indicates the average backscattering strength SV of Plume 1 which is the first plume from the left of FIG. 12. The first bold line from the top indicates the average backscattering strength SV of Plume 2 which is the second plume from the right of FIG. 12. The second bold line from the bottom indicates the average backscattering strength of Plume 3 which is the first plume from the right of FIG. 12. The second bold line from the top indicates the average value of all the plumes.

As shown in FIG. 15, the average backscattering strength SV indicates the highest value from the lower portion of each plume toward the intermediate portion thereof, and meanwhile, indicates a relatively low value in the upper portion of each plume. Moreover, variations of the average backscattering strengths SV are small in a range from the seabed to the depth of 700 m under the surface of the sea, on the other hand, the average backscattering strengths SV takes different values for each of the plumes in a range of the depth of 700 m under the surface of the sea or shallower. This fact tells that of the backscattering strength on the grid obtained by cutting the mixture into round slices in the depth direction by the width of 20 to 100 m, in the range from the seabed to the depth of 300 m, were calculated, and in such a way, it was found out that the methane hydrate exists in the seabed immediately under the plume. With regard to the above, it can be confirmed that the above-described predetermined height is 300 m from "(depth to seabed)−(average depth of integrated layer)" of Table 1, and that the above-described predetermined width is 20 to 100 m from "thickness of integrated layer" of Table 1.

Furthermore, when the measurement results of the plume concerned were analyzed in detail, results shown in Table 2 were obtained.

TABLE 2

| Depth (m) | SV Value (dB) |
| --- | --- |
| 881.09 | −43.63 |
| 856.99 | −42.35 |
| 877.62 | −36.74 |

A depth of the sea is 896.1 m.

Specifically, there was strong backscattering strength of −44 to −36 dB in the integrated layer within the depth of 100 m from the seabed. Hence, it was found out that the resource exists in the seabed immediately under the plume as descried above.

Moreover, the average backscattering strength SV indicates the highest value from the lower portion of the plume toward the intermediate portion thereof, and meanwhile, indicates a relatively low value in the upper portion of the plume.

Furthermore, the methane hydrate was discovered from the place where the inventors of the present invention observed the methane plume.

From these results, it was found out that the seabed resource exploration system and the seabed resource exploration method according to this embodiment are effective for finding the place where the methane hydrate is reserved.

INDUSTRIAL APPLICABILITY

As described above, the seabed resource exploration system and the seabed resource exploration method according to the present invention are useful for work of exploring the methane hydrate reserved in the seabed.

What is claimed is:

1. A seabed resource exploration system, comprising:
   a transmitter (1) configured to transmit a sound wave into the sea;
   a receiver (1) configured to receive a scattered wave in which the sound wave is reflected on a boundary surface between seawater and a mixture of methane gas and methane hydrate, the mixture exists in the seawater; and
   an analyzer (17) configured to determine an existence of the methane hydrate in a seabed immediately under the mixture when backscattering strength, calculated by the transmitted sound wave and the received scattered wave, is in a predetermined relationship,
   wherein the predetermined relationship is that a maximum value of the backscattering strength is −60 to −30 dB and an average value of the backscattering strength is −70 to −50 dB, the backscattering strength is on a grid obtained by cutting the mixture into round slices in the depth direction by a predetermined width, in a range from the seabed to a predetermined height.

2. The seabed resource exploration system according to claim 1,
   wherein the predetermined height is 300 m, and
   the predetermined width is 20 to 100 m.

3. A seabed resource exploration method, comprising:
   a transmission step of transmitting a sound wave into the sea;
   a step of receiving a scattered wave in which the sound wave is reflected on a boundary surface between seawater and a mixture of methane gas and methane hydrate, the mixture exits in the seawater; and
   an analysis step of determining that the methane hydrate exists in a seabed immediately under the mixture when backscattering strength, calculated by the transmitted sound wave and the received scattered wave, is in a predetermined relationship,
   wherein the predetermined relationship is that a maximum value of the backscattering strength is −60 to −30 dB and an average value of the backscattering strength is −70 to −50 dB, the backscattering strength is on a grid obtained by cutting the mixture into round slices in the depth direction by a predetermined width, in a range from the seabed to a predetermined height.

* * * * *